(12) United States Patent
Mudd et al.

(10) Patent No.: US 7,690,614 B1  
(45) Date of Patent: Apr. 6, 2010

(54) FRICTION MOUNT APPARATUS FOR AN ELECTRONIC DEVICE

(75) Inventors: John J. Mudd, Olathe, KS (US); Brian G. Schoenfish, Kansas City, KS (US); Jeffrey D. Minelli, Olathe, KS (US); David J. Laverick, Overland Park, KS (US)

(73) Assignee: Garmin Ltd. (KY)

( * ) Notice: Subject to any disclaimer, the term of this patent is extended or adjusted under 35 U.S.C. 154(b) by 794 days.

(21) Appl. No.: 10/950,857

(22) Filed: Sep. 28, 2004

(51) Int. Cl.  
*A47B 91/00* (2006.01)

(52) U.S. Cl. .................. 248/346.06; 248/910; 224/929

(58) Field of Classification Search ............ 248/346.06, 248/346.2, 910, 346.03, 346.01, 181.1; 312/223.4; 379/454, 455; 224/929  
See application file for complete search history.

(56) References Cited

U.S. PATENT DOCUMENTS

| | | | |
|---|---|---|---|
| 4,195,880 A * | 4/1980 | Henkhaus | 297/188.18 |
| 5,332,185 A * | 7/1994 | Walker, III | 248/346.2 |
| 5,845,885 A * | 12/1998 | Carnevali | 248/181.1 |
| 5,860,824 A * | 1/1999 | Fan | 439/265 |
| D451,833 S | 12/2001 | Schoenfish et al. | D10/74 |
| 6,371,345 B1 * | 4/2002 | Leyden et al. | 224/553 |
| 6,439,530 B1 | 8/2002 | Schoenfish et al. | 248/346.06 |
| 6,840,487 B2 | 1/2006 | Carnevalli | 248/346.06 |
| 7,093,757 B2 * | 8/2006 | Boucher et al. | 235/462.01 |
| 2003/0102419 A1 | 6/2003 | Carnevalli | |

* cited by examiner

*Primary Examiner*—Korie H. Chan  
(74) *Attorney, Agent, or Firm*—Samuel M. Korte (57) ABSTRACT

A friction mount apparatus for supporting an electronic device (10) on a surface (14). The apparatus (10) includes a body (16), anchors (18,20,22), and a receiving member (24). Body (16) includes a recessed surface (30) on the bottom thereof into which a foam layer (36) is secured, wherein the foam layer (36) contacts a mounting surface (14) and resists moving relative to the surface (14). The anchors (18,20,22) are connected to the body (16) via flexible necks (38,40,42) and have bottom surfaces formed of soft material and weighted cores to press the bottom surfaces against the mounting surface to resist movement relative to the mounting surface (14) and thus further stabilize the apparatus (10). The receiving member (24) is secured to a top surface of the body (16) and is adapted to releasably retain an electronic device (12).

25 Claims, 4 Drawing Sheets

FRICTION MOUNT APPARATUS FOR AN ELECTRONIC DEVICE

BACKGROUND OF THE INVENTION

1. Field of the Invention

The present invention relates to a mounting apparatus for an electronic device. More specifically, the invention relates to a removable mounting apparatus for an electronic device that is frictionally secured to a support surface, wherein the support surface presents limited surface space and/or includes one or more contours.

2. Description of Prior Art

The use of electronic devices in vehicles has increased in recent years. For example, it is increasingly more common to see electronic devices such as global positioning satellite devices, portable telephones, radios and personal digital assistants (PDAs) mounted within vehicles either permanently or, in the case of portable electronics, removably. Many of these devices have a screen which visibly communicates information to the user thereof. Thus, it is advantageous to be able to adjust the position and the angle of the device to provide maximum viewing capability to the user. The portable device further is advantageous in that it can be taken from the vehicle and used outside of the vehicle, thus adding value to the device.

Due to the wide variety of electronic devices that can be mounted within a vehicle, many different types of mounting apparatuses exist that can secure an electronic device to the dashboard, floor, or other support surface in a vehicle such that a user may view and access the device. Prior art mounting apparatuses typically are secured to the dashboard or floor through the use of screws, bolts, clips, rivets, VELCRO™, putty or other types of fasteners or adhesives known in the art.

The mounting of devices within vehicles presents a number of challenges. For example, it is difficult to mount an electronic device in a vehicle without causing damage to the surface to which it is mounted, such as the dashboard or floor. In a number of instances, one or more fasteners are secured through drilling into the surface of the dashboard, or through the floor, to secure the mounting apparatus. When the fasteners are disconnected and the mounting apparatus is removed from its original location, one or more holes remain in the support surface.

In addition, it is difficult to re-mount the electronic device at a different location in the vehicle. In order to change the location of the electronic device within the vehicle, the mounting apparatus must first be removed from its original location. This requires a variety of tools to remove the screws or adhesives that were used to secure the mounting apparatus in its original location. Once removed from its original location, the mounting apparatus must then be secured in the new location, again through the use of screws, adhesive material, or the like. The removal, placement and re-fastening of the device can be a time consuming process, diminishing the feasibility of convenient, frequent location changes within a vehicle or between vehicles.

Devices have been developed to overcome some of the above-mentioned challenges. U.S. Pat. No. 6,439,530 (the '530 patent), for example, held by the Garmin Corporation and entitled "MOUNTING APPARATUS FOR AN ELECTRONIC DEVICE," discloses an apparatus for removably mounting an electronic device on a contoured surface, wherein the apparatus includes a broad flexible base adapted to conform to and couple with the contoured surface. The apparatus of the '530 patent is not ideal for all situations, however, because it is not well adapted to fit into small areas or around protrusions such as levers and posts.

Accordingly, there remains a need for a removable mounting apparatus that can be easily mounted within a vehicle without damaging a mounting surface of the vehicle, wherein the apparatus is adapted to conform to various contours of a surface and is effective even on surfaces with limited space and/or numerous obstacles.

SUMMARY OF THE INVENTION

The present invention provides an improved friction mount apparatus for an electronic device that does not suffer from the problems and limitations of the prior art described above. Particularly, the present invention provides a friction mount apparatus that securely holds an electronic device such as a GPS receiver and that fits into small areas and areas heavily populated with levers, switches, or other equipment and that can be easily repositioned.

In one embodiment, the apparatus comprises a body including a bottom surface composed of a soft material for contacting a surface of a vehicle and resisting movement relative to the surface and an anchor connected to the body via a flexible neck, wherein the anchor includes a bottom surface composed of a soft material that contacts the surface of the vehicle and resists moving relative to the surface. The anchor and the body are of limited size to allow the apparatus to be easily positioned and repositioned. A receiving member is secured to a top of the body, wherein the receiving member couples the electronic device to the body.

In another embodiment of the invention, the friction mount apparatus includes an elliptical body with a soft bottom surface, wherein the bottom surface contacts a surface of the vehicle and resists moving relative to the surface. Three elliptical anchors are connected to the body via flexible necks, wherein each anchor includes an inner metal portion for giving weight to the anchor and a soft bottom surface of the anchor for contacting the surface of the vehicle and resisting movement relative to the surface.

In another embodiment, the invention features a receiving apparatus for pivotally coupling an electronic device to a removable mount. The receiving apparatus comprises a base attached to the mount, wherein the base pivots relative to the mount, and a receptacle for receiving and releasably retaining the electronic device, wherein the receptacle is pivotally attached to the base and pivots about a horizontal axis.

In another embodiment of the invention, the receiving apparatus comprises a circular base attached to the mount, wherein the base pivots relative to the body about a vertical axis. A receptacle receives and retains the electronic device, the receptacle including a bottom segment for seating the electronic device, wherein a first longitudinal edge of the bottom segment is pivotally attached to the base so that the bottom segment pivots relative to the base about a horizontal axis corresponding to the edge, and wherein an arcuate ratchet surface depends from a second longitudinal edge of the bottom segment and adjustably engages the base. A first side portion extends perpendicularly from a first end of the bottom segment and away from the base, the first side portion including a detent to releasably retain the electronic device. A second side portion extends perpendicularly from a second end of the bottom segment and away from the base, the second side portion including a detent to releasably retain the electronic device. A back portion supports the electronic device and extends perpendicularly from the second longitudinal edge of the bottom portion and away from the base, wherein the back portion includes an access port for receiving an electrical contact.

In another embodiment of the invention, the friction mount apparatus includes an elliptical body with a top surface and a bottom surface, wherein a foam layer is attached to the bottom surface so that the foam layer contacts the surface of the vehicle and resists moving relative to the surface of the vehicle.

A first elliptical anchor is connected to the base via a first flexible neck, wherein the first neck extends from the body along a minor axis of the body, and wherein the anchor is attached to the leg so that a major axis of the anchor is parallel with a major axis of the body, the anchor including an inner metal portion for giving weight to the anchor and a foam layer attached to a bottom surface of the anchor for contacting the surface of the vehicle and resisting movement relative to the surface of the vehicle.

A second elliptical anchor is connected to the base via a second flexible neck, wherein the second neck extends radially from the body along a line that is one hundred thirty-five degrees counterclockwise from the first neck, and wherein the second anchor is attached to the neck so that a major axis of the anchor is parallel with a major axis of the body, the second anchor including an inner metal portion for giving weight to the anchor and a foam layer attached to a bottom surface of the anchor for contacting the surface of the vehicle and resisting movement relative to the surface of the vehicle.

A third elliptical anchor is connected to the base via a third flexible neck, wherein the third flexible neck extends radially from the body along a line that is two hundred twenty-five degrees counterclockwise from the first neck, and wherein the third anchor is attached to the third neck so that a major axis of the third anchor is parallel with a major axis of the body, the third anchor including an inner metal portion for giving weight to the anchor and a foam layer attached to a bottom surface of the anchor for contacting the surface of the vehicle and resisting movement relative to the surface of the vehicle. Finally, a receiving member is attached to the body for securing the electronic device to the body.

These and other important features of the present invention are more fully described in the section titled DETAILED DESCRIPTION OF PREFERRED EMBODIMENTS, below.

BRIEF DESCRIPTION OF THE DRAWINGS

A preferred embodiment of the present invention is described in detail below with reference to the attached drawing figures, wherein.

DETAILED DESCRIPTION OF PREFERRED EMBODIMENTS

Figure 1:
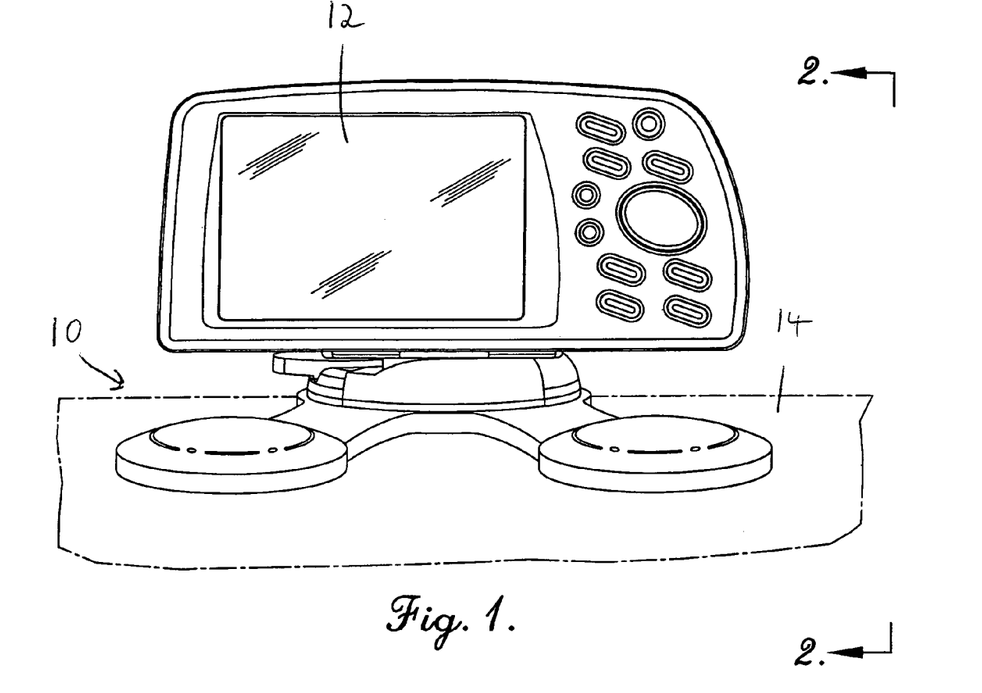
FIG. 1 is a perspective view of a friction mount apparatus constructed in accordance with a first preferred embodiment of the invention, wherein the apparatus is depicted securing an electronic device to a contoured support surface of a vehicle.
Figure 2:
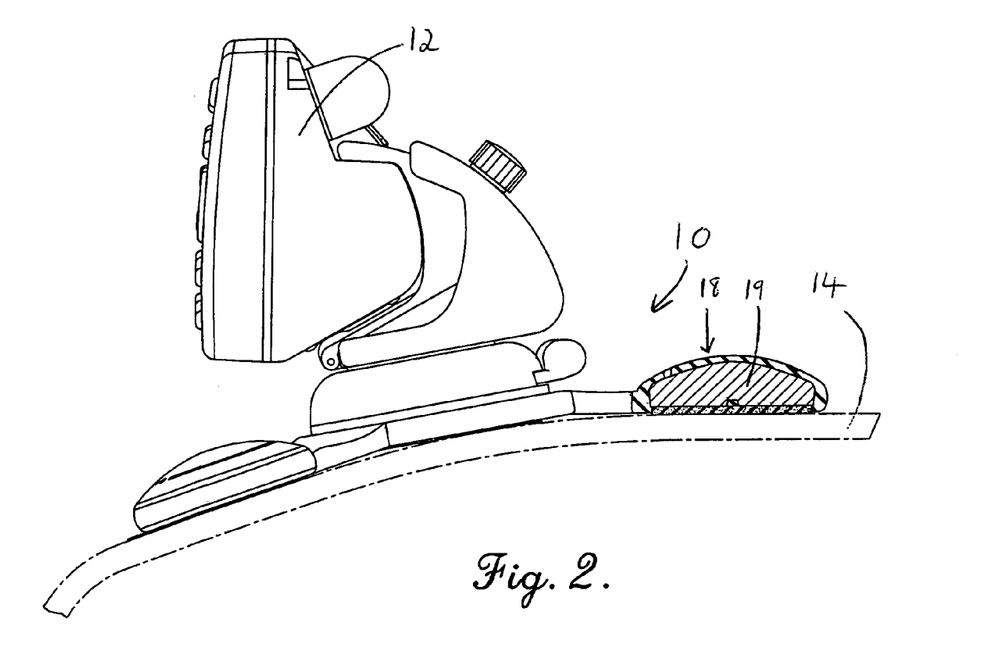
FIG. 2 is a side elevation view of the device of FIG. 1 showing a cross-sectional view of an anchor of the device.
Figure 3:
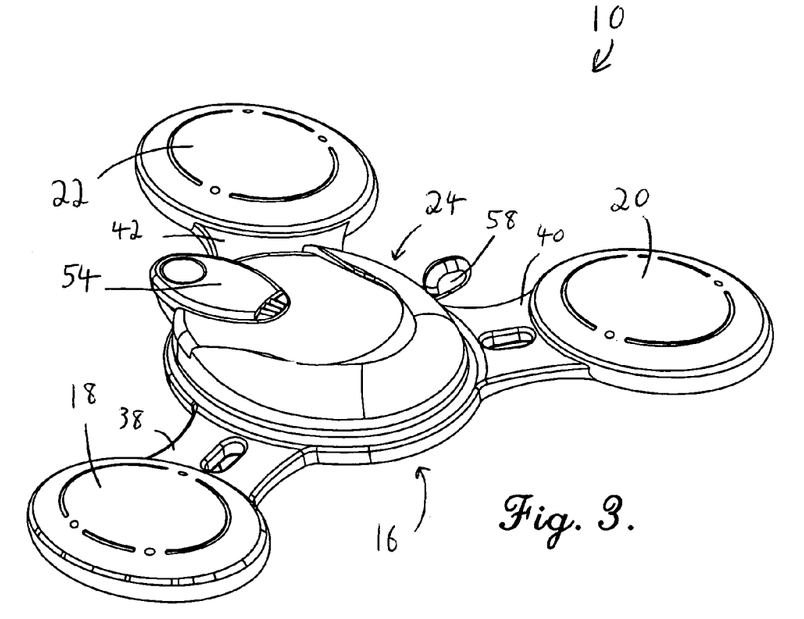
FIG. 3 is a perspective view of the apparatus of FIG. 1, wherein the apparatus is depicted without the support surface and without the electronic device.
Figure 4:
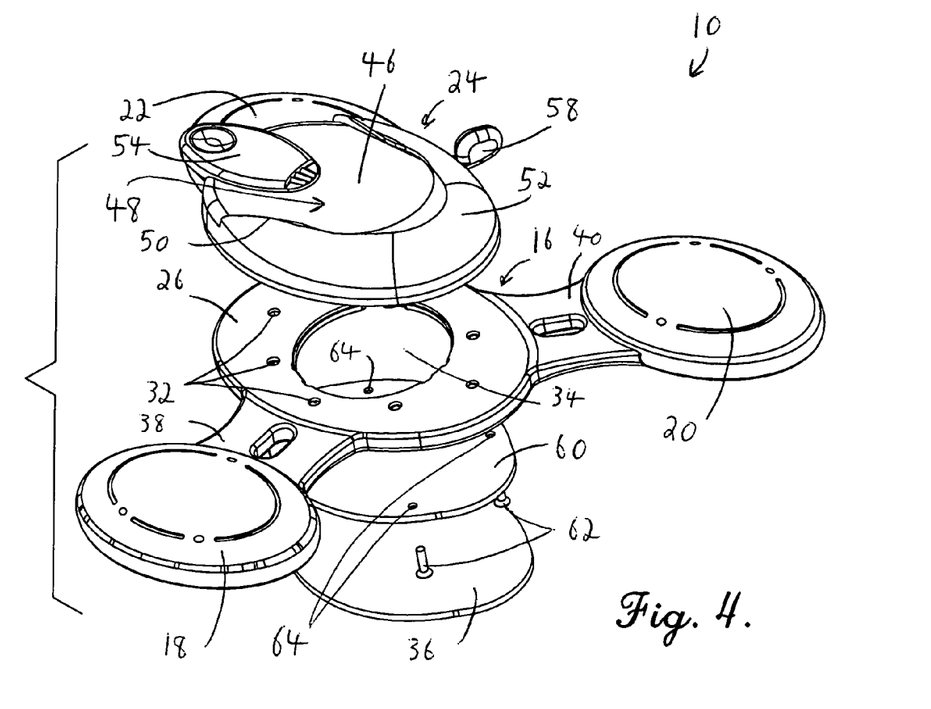
FIG. 4 is an exploded top perspective view of the apparatus of FIG. 1.
Figure 5:
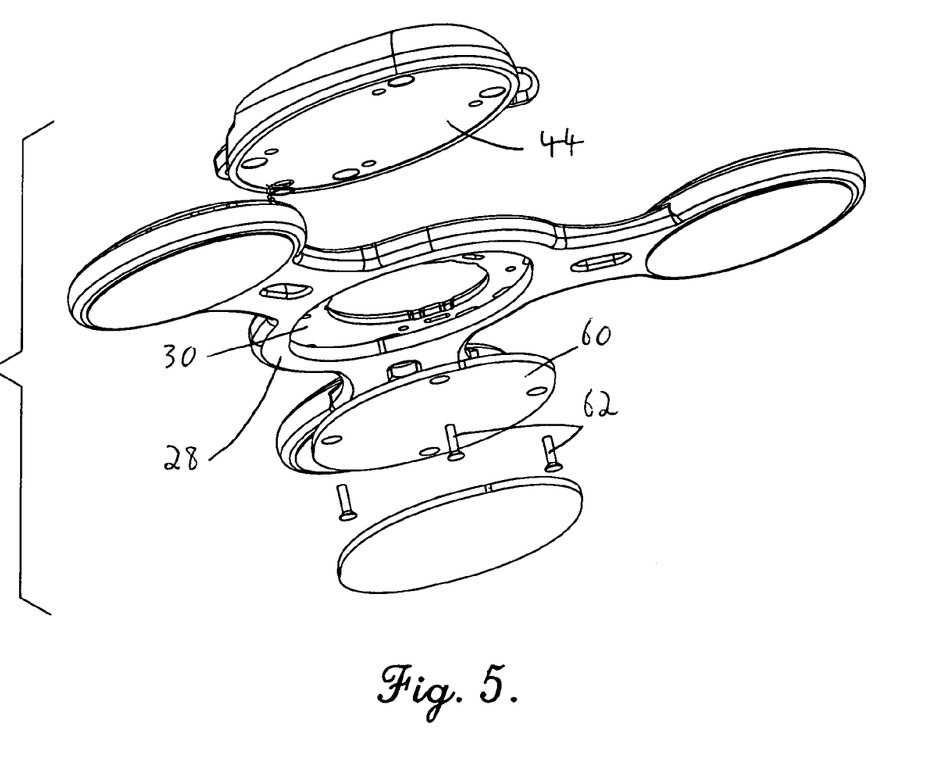
FIG. 5 is an exploded bottom perspective view of the apparatus of FIG. 1.

Referring initially to FIGS. 1 and 2, an exemplary friction mount apparatus employing the principles of the present invention is shown and designated generally by the reference numeral 10. The friction mount apparatus 10 receives an electronic device 12 and rests on a mounting surface, such as the illustrated contoured mounting surface 14 of a vehicle. The apparatus 10 is secured in place by friction between it and the mounting surface 14. Referring also to FIGS. 3-5, the friction mount apparatus 10 broadly comprises a body 16, a plurality of radially-extending anchors 18,20,22, and a receiving member 24 attached to the top of the body 16.

The body 16 generally receives and supports the receiving member 24, contacts the mounting surface 14, and resists moving relative to the mounting surface 14. The illustrated body 16 has an elliptical disc shape with a top surface 26 and a bottom surface 28. The bottom surface 28 encircles a recessed surface 30 that is also substantially elliptical in shape and is recessed from the bottom surface 28 approximately one-quarter of an inch. A series of small holes 32 and a large aperture 34 extend from the recessed surface 30 to the top surface 26 of the body 16 and are used in securing the receiving member 24 to the body 16, as discussed below in greater detail.

A friction layer 36 is also encircled by the bottom surface 28 of the body 16, wherein the friction layer 36 grips the mounting surface 14 to resist movement relative to the mounting surface 14. The friction layer 36 is made of a soft material, preferably a foam layer one-eighth of an inch thick, but it will be appreciated that any material may be used that grips the mounting surface 14 such as, for example, rubber, plastic, leather, cloth and vinyl. As illustrated, the friction layer 36 is placed within the recessed portion of the body 16 and extends below the bottom surface 28 of the body 16 so that a surface of the friction layer 36 contacts the mounting surface 14 when the body 16 rests on the mounting surface 14. Friction layer 36 prevents sliding by conforming to the mounting surface 14, thus increasing the friction between the body 16 and the surface 14. Friction layer 36 further prevents the body 16 from bouncing on the surface 14 by absorbing shock and vibrations, thus maintaining contact with the surface 14. It will be appreciated that the body may take various shapes and employ various means to resist moving relative to the mounting surface 14.

The anchors 18,20,22 generally prevent the body 16 from moving by contacting the mounting surface 14 and resisting movement relative to the surface 14. The illustrated anchors 18,20,22 are attached to the body 16 via necks 38,40,42. The necks 38,40,42 flexibly couple the anchors 18,20,22 to the body 16 so that the anchors 18,20,22 may secure the apparatus 10 to virtually any surface, including a contoured mounting surface. The necks 38,40,42 are thinner and more narrow than the anchors 18,20,22 and therefore allow the anchors 18,20,22 to independently change position relative to the body 16 by, for example, twisting, rotating up or down, and/or moving radially. It will be appreciated that allowing the anchors 18,20,22 to change position relative to the body 16 enhances the ability of the apparatus 10 to frictionally attach to the mounting surface 14 by, for example, enabling the anchors 18,20,22 to shift into a position that maximizes the contact area with the mounting surface 14.

The flexibility of the anchors 18,20,22 and necks 38,40,42 allows the user to place the apparatus 10 a broader range of locations than prior art mounting apparatuses, including, for example, in locations that are more convenient for use and in locations that may be completely inaccessible to prior art mounting apparatuses. By way of example, the apparatus 10 may be mounted proximate a lever, post or corner so that two of the anchors 18,20,22 are placed on either side of the lever, post or corner. It will be appreciated that in some environments, such as in an emergency vehicle, the area around the driver's seat is heavily populated with switches, levers, and other controls and equipment leaving little open space to place a removable mounting device. In such environments the ability of the apparatus 10 to securely rest among other pieces of equipment or on a contoured surface is essential.

Each of the anchors 18,20,22 are virtually identically configured, therefore only anchor 18 will be described in detail with the understanding that anchors 20,22 are similarly constructed. Likewise, each of the necks 38,40,42 are virtually identically configured, therefore only neck 38 will be described in detail with the understanding that necks 40,42 are similarly constructed. In the preferred embodiment, neck 38 extends radially from the body 16 approximately three-quarters of an inch along a minor axis of the body 16 and is approximately one and one-quarter inch wide. Neck 40 extends radially from the body 16 from a point one hundred thirty-five degrees counterclockwise from neck 38. Neck 42 extends radially from the body 16 from a point two hundred twenty-five degrees counterclockwise from neck 38.

Anchor 18 is elliptical with a rounded top surface and a soft, flat bottom surface. The bottom surface contacts and grips the mounting surface 14 and may be composed of a material similar to that of the friction layer 36 that attaches to the recessed surface 30 of the body 16. Thus, anchor 18 may include a recessed surface on the bottom thereof (not shown) similar to the recessed surface 30 of the body 16 to receive a layer of soft material similar to friction layer 36 of the body 16. The bottom surface of the anchor 18 resists movement relative to the mounting surface 14 in a manner similar to the friction layer 36 secured to the recessed surface 30 of the body 16 and described above.

Anchor 18 includes a core 19 formed of a dense material as best illustrated in the cross-sectional view of the anchor 18 in FIG. 2. The dense core 19 augments the weight of the anchor 18 and increases the ability of the anchor 18 to grip the mounting surface 14 by, for example, pushing the soft bottom surface of the anchor 18 against the mounting surface 14 to increase the friction between the mounting surface 14 and the bottom surface of the anchor 18, and by increasing the inertia of the anchor 18. The core's dense material is preferably metal, such as steel, tin, or copper, but may be any material of sufficient density to increase the weight of the anchor 18 without substantially increasing the size of the anchor 18. Furthermore, the core 19 may exhibit magnetic properties that allow it to magnetically couple to mounting surface 14, if, for example, a portion of the mounting surface 14 is steel or other magnetically responsive material. Although extending from different points around the body 16, each of the anchors 18,20,22 has a major axis that is parallel with a major axis of the body 16.

The body 16 and the anchors 18,20,22 are formed of rubber or other flexible material and are integrally connected. Constructing the body 16 and anchors 18,20,22 of a flexible material allows the apparatus to further resist moving relative to the mounting surface 14 by dampening movement between the body 16 and each of the anchors 18,20,22.

The receiving member generally removably couples the electronic device to the body of the apparatus. The illustrated receiving member 24 is described in U.S. Pat. No. 6,129,321 to Minelli et al. issued Oct. 10, 2000, which is hereby incorporated by reference in its entirety. The receiving member described in the Minelli patent is useful for accepting the electronic device 12, but itself is not capable of being removably mounted to a surface. Referring back to the present invention and to FIGS. 1-4, the apparatus 10 allows receiving member 24 to be removably secured to mounting surface 14. Receiving member 24 generally includes a lower face 44 coupled to the body 16 and an upper face 46 having a slot 48 formed therein. The slot 48 includes an upper retaining edge 50 defined by a shoulder 52 adapted to engage the electronic device 12 and prevent the device 12 from upward movement relative to the receiving member 24.

Receiving slot 48 extends from the upper face 46 of the receiving member 24 and includes an open end adapted to accept a pedestal or other connecting structure of the electronic device 12. Locking arm 54 is a retaining mechanism that is in line with the open end of receiving slot 48. Locking arm 54 further includes a ratchet and pawl mechanism, not shown, that is adapted to releasably hold the electronic device 12 within the receiving slot 48. Handle 58 is coupled to the pawl and ratchet mechanism and allows for the selective removal of the electronic device 12 from the receiving slot 48. Specifically, handle 58 is moved between an engaged position so that the electronic device is retained in receiving slot 48 and a disengaged position to allow for the removal of the electronic device 12. It will be appreciated that receiving slot 48 could take various forms wherein receiving member 24 is adapted to selectively engage an electronic device and is adapted to be coupled to the body 16.

Referring particularly to FIGS. 4 and 5, the receiving member 24 is secured to the body 16 with mounting plate 60 and fasteners 62. Mounting plate 60 is shaped to fit into the recessed portion of the body 16 and therefore is approximately the same size as the recessed surface 30. Mounting plate 60 includes mounting holes 64 that align with some of the small holes 32 of the body 16 when the mounting plate 60 is placed in the recessed portion of the body 16. Fasteners 62 are preferably bolts that extend through mounting holes 64 of the mounting plate 60, through the small holes 32 of the body 16, and fasten to the receiving member 24, thus securing the receiving member 24 to the body 16. It will be appreciated that a variety of methods may be used to secure the receiving member 24 to the body 16 such as, for example, gluing or riveting the receiving member 24 to the body 16.

The friction layer 36 is secured to the mounting plate 60 so that a surface of the friction layer 36 extends below the bottom surface 28 of the body 16. The friction layer 36 is preferably glued to the mounting plate 60, but may be integral with the mounting plate 60 or may be attached to or integral with the body 16 if the mounting plate 60 is not used to secure the receiving member 24 to the body 16.

Figure 6:
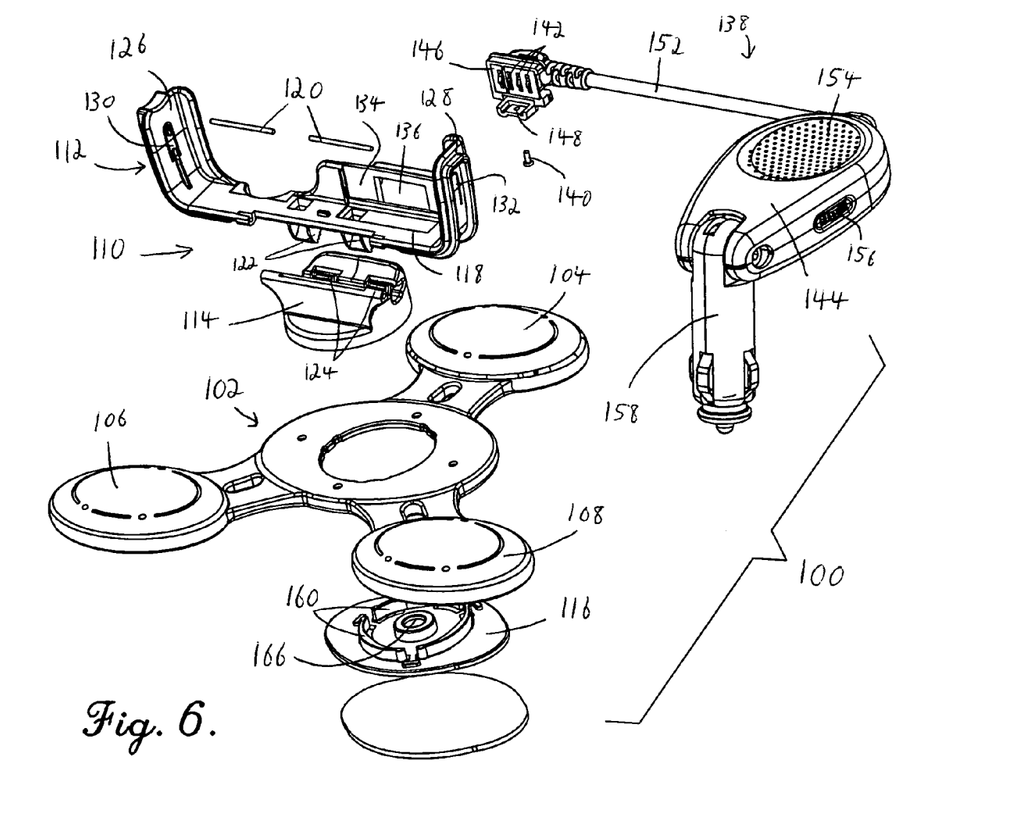
FIG. 6 is a perspective exploded view of a friction mount apparatus constructed in accordance with a second preferred embodiment of the invention.
Figure 7:
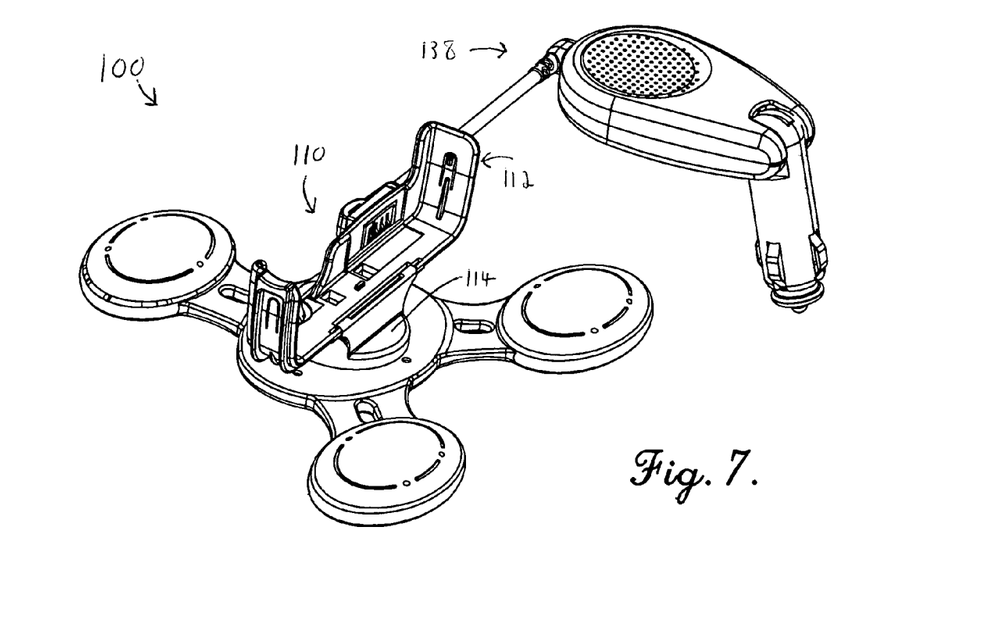
FIG. 7 is a perspective view of the apparatus of FIG. 6.

Referring to FIGS. 6 and 7, a friction mount apparatus 100 is shown constructed according to a second preferred embodiment of the present invention. The friction mount apparatus 100 generally receives the electronic device and rests on a mounting surface, including a contoured mounting surface, secured in place by friction between the mounting surface and the apparatus. The friction mount apparatus 100 broadly comprises a body 102, a plurality of radially-extending anchors 104,106,108, and a receiving member 110. The body 102 and the anchors 104,106,108 are substantially identical to the body 16 and the anchors 18,20,22 of the apparatus 10, described above in detail, and therefore will not be described here.

The receiving member 24 generally removably couples the electronic device 12 to the body 16 of the apparatus 10 and allows the electronic device 12 to be selectively rotated and pivoted about two axes. The illustrated receiving member 110 broadly comprises a receptacle 112, a base 114, and a mounting plate 116. The receptacle generally removably and pivotally secures the electronic device to the base. The illustrated receptacle 112 comprises a bottom segment 118 for seating the electronic device 12, wherein the electronic device 12 abuts against the bottom segment 118 when placed in the receptacle 112. A first longitudinal edge of the bottom segment is pivotally attached to the base 114 with pivot pins 120. A plurality of arcuate ratchet surfaces 122 depend from a second longitudinal edge of the bottom segment 118 and adjustably engage detents 124 of the base 114, wherein the ratchet surfaces 122 comprise a series of grooves and ridges. The detents 124 thus engage grooves of the ratchet surfaces 122 and tend to secure the ratchet surfaces 122 in a fixed position until a user pivots the receptacle 112 about the pivot pins 120, forcing the detents 124 to disengage the grooves.

The receptacle 112 further comprises a first side portion 126 that extends perpendicularly from a first end of the bottom segment and away from the body 102; and a second side portion 128 that extends perpendicularly from a second end of the bottom segment and away from the body 102. Side portions 126,128 engage opposite ends of the electronic device and thus brace the device to prevent it from shifting or falling from the receptacle 112. The side portions 126,128 further include detents 130,132, respectively, that releasably retain the electronic device 12 by engaging ends thereof to prevent the electronic device 12 from sliding upward without user initiation. The receptacle 112 further includes a back portion 134 that lends further support for the electronic device 12 while the device is secured in the receptacle 112 by preventing the device from moving or shifting backwards while engaging the receptacle 112. The back portion 134 includes an access port 136 for receiving connector face 146 of electrical connector arm 138. A bolt 140 secures connector arm 138 to the bottom segment 118 so that electrical contacts 142 are flush with, or extend through, access port 136, as illustrated in FIG. 7, allowing the contacts 142 to contact corresponding leads (not shown) of the electronic device 12. As described below in greater detail, the contacts 142 connect the electronic device to, for example, a vehicle's power source and/or a speaker. It will be appreciated that locating electrical contacts on back portion 134 of the receptacle 112 facilitates use of the apparatus 100 by combining the steps of securing the electronic device 12 to the apparatus 100 and electrically connecting the electronic device 12 to external devices or systems. When the user inserts the electronic device 12 into the receiving member 110, for example, the electronic device is automatically connected to an external speaker and to the vehicle's power system.

Referring particularly to FIG. 6, the base 114 is secured to the body 102 with mounting plate 116, in a manner similar to that described in relation to the receiving member 20, discussed above. Mounting plate 116 is shaped to fit into the recessed portion of the body 102 and therefore is approximately the same size as the recessed surface 162. Mounting plate 116 presents a series of arcuate flanges 160 that align with the large aperture 164 of the body 102 when the mounting plate 116 is placed in the recessed portion of the body 102. The arcuate flanges 160 receive the base 114 and guide its rotational movement by, for example, mating with arcuate slots (not shown) in the base 114. A central retaining hole 166 in the mounting plate 116 receives a fastener (not shown) extending downward from the base 114, so that the fastener rotatably secures the base 114 to the mounting plate 116. The mounting plate 116 is further glued to the recessed surface 162 of the body 102. It will be appreciated that a variety of methods may be used to secure the base 114 to the body 102 such as, for example, securing the base 114 to the body 102 with fasteners, such as bolts or rivets.

The connector arm 138 connects the electronic device 12 to external electrical devices and/or systems and supports electronic peripheral devices. In the preferred embodiment, the connector arm 138 provides electrical contacts 142 that connect the electronic device 12 to the vehicle's power source, and connect an audio output signal from the electronic device to a peripheral speaker 144. A connector face 146 presents the contacts 142 and mates with the access port 136, and a lug 148 extends from a lower portion of the connector face 146. The bolt 140 or other fastener extends through the lug 148 and secures to the bottom portion 118 of the receiving member 112, thus securing the connector arm 138 to the receiving member 112. It will be appreciated that a variety of methods may be used to secure the connector face 146 to the receiving member 112, including, for example, a tongue-and-groove mechanism.

A boom 152 pivotally secures the connector face 146 to the speaker 144 and carries the wires or other conductors from the contacts 142 of the connector face 146 to the speaker 144. The boom 152 is pivotally connected to the connector face 146 to allow the boom 152 to pivot relative to the face 146 about one or more axes, and is pivotally connected to the speaker 144 to allow the speaker 144 to pivot relative to the boom 152 about one or more axes.

The speaker 144 gives voice to audio signals communicated thereto from the electronic device 12 via the contacts 142 and the boom 152. The speaker 144 is of a type known in the art and includes, for example, a speaker grill 154 and a volume control knob 156. Because the speaker 144 is pivotally attached to the boom 152, and the boom 152 is pivotally attached to the connector face 146, a user may adjust a position of the speaker 144 relative to the apparatus 100 to optimize use of the speaker 144. A power receptacle 158 is pivotally attached to the speaker 144 for receiving electrical power from the vehicle's power system and regulating and/or communicating the power to the speaker 144, wherein the speaker 144 is driven by the power and also communicates the power to the boom 152. The power receptacle 158 is preferably connected to a power cable (not shown) that connects the receptacle 158 to a vehicle's power converter (not shown), such as a cigarette lighter. Alternatively, the power receptacle 158 may be connected directly to the vehicle's power converter.

Although the invention has been described with reference to the preferred embodiments illustrated in the attached drawings, it is noted that equivalents may be employed and substitutions made herein without departing from the scope of the invention as recited in the claims. It will be appreciated, for example, that the apparatus 10 may include any number of anchors of various shapes and sizes, and that the receptacle 112 may partially or fully encase the electronic device 12. Furthermore, friction layer 36 may present an adhesive surface instead of or in addition to the soft surface described herein.

Having thus described the preferred embodiment of the invention, what is claimed as new and desired to be protected by Letters Patent includes the following:

1. A friction mount apparatus for supporting an electronic device on a surface, the apparatus comprising:
   a body for placement on the surface and resisting movement relative to the surface;

an anchor connected to the body via a flexible neck, wherein the anchor contacts the surface and resists moving relative to the surface; and a receiving member secured to a top of the body, for receiving and securing the electronic device to the body, wherein the receiving member includes a base attached to the body and a receptacle for receiving and securing the electronic device, wherein the base pivots relative to the body about a vertical axis, and the receptacle is pivotally attached to the base and pivots about a horizontal axis, wherein the receptacle includes a rectangular bottom portion and a first edge of the bottom portion is pivotally attached to the base and a second edge of the bottom portion adjustably engages the base.

2. The friction mount apparatus as set forth in claim 1, wherein the body has a bottom surface formed of soft material that contacts the surface of the vehicle and resists moving relative to the surface.

3. The friction mount apparatus as set forth in claim 2, wherein the anchor has a bottom surface formed of soft material that contacts the surface and resists moving relative to the surface.

4. The friction mount apparatus as set forth in claim 3, wherein the bottom surface of the body and the bottom surface of the anchor are formed of foam material.

5. The friction mount apparatus as set forth in claim 4, wherein the anchor includes a dense core for giving weight to the anchor.

6. The friction mount apparatus as set forth in claim 5, wherein the core is formed of metal and is concealed inside the anchor.

7. The friction mount apparatus as set forth in claim 6, wherein a portion of the core exhibits magnetic properties for magnetically coupling the anchor to at least a portion of the surface.

8. The friction mount device as set forth in claim 6, wherein the anchor and the body are each substantially elliptical in shape and the neck is narrower than the anchor and the body.

9. The friction mount apparatus as set forth in claim 8, wherein the body and the anchor are made of rubber and are integrally connected.

10. The friction mount apparatus as set forth in claim 1, further comprising:

a second anchor connected to the body via a second flexible neck, wherein the anchor contacts the surface and resists moving relative to the surface; and a third anchor connected to the body via a third flexible neck, wherein the anchor contacts the surface and resists moving relative to the surface.

11. The friction mount apparatus as set forth in claim 10, wherein each of the anchors has a bottom surface formed of soft material that contacts the surface and resists moving relative to the surface.

12. The friction mount apparatus as set forth in claim 11, wherein the bottom surface of each anchor is formed of foam material.

13. The friction mount apparatus as set forth in claim 12, wherein each anchor includes a dense core for giving weight to the anchor.

14. The friction mount apparatus as set forth in claim 13, wherein the dense core is formed of metal and is concealed inside the anchor.

15. The friction mount apparatus as set forth in claim 14, wherein the necks extend radially from the body and are approximately equally spaced radially.

16. The friction mount apparatus as set forth in claim 1, wherein the receiving member includes— a receiving slot operable to removably receive at least a portion of the electronic device, and a releasable locking mechanism operable to releasably retain at least a portion of the electronic device within the receiving slot.

17. The friction mount apparatus as set forth in claim 1, the receptacle further including a first side portion extending from a first end of the bottom portion and a second side portion extending from a second end of the bottom portion, wherein the first side portion and the second side portion each include a locking mechanism to releasably secure the electronic device to the receptacle.

18. The friction mount apparatus as set forth in claim 17, further comprising an electrical connector arm secured to the electronic device through an access port of the receiving member, wherein the arm receives electrical power from a vehicle power source and communicates the electrical power to the electronic device.

19. The friction mount apparatus as set forth in claim 18, wherein the connector arm includes a speaker and communicates audio signals from the electronic device to the speaker.

20. A friction mount apparatus for supporting an electronic device on a surface, the apparatus comprising:

an elliptical body with a bottom surface formed of soft material, wherein the bottom surface contacts a surface of the vehicle and resists moving relative to the surface;

a receiving member coupled to the body for securing the electronic device to the body, including— a base attached to the body, wherein the base pivots relative to the body about a vertical axis, and a receptacle for receiving and securing the electronic device, the receptacle including a bottom segment for seating the electronic device, wherein a first edge of the bottom segment is pivotally attached to the base so that the bottom segment pivots around a horizontal axis, and a ratchet surface depends from a second edge of the bottom segment and adjustably engages the base, a first side portion extending perpendicularly from a first end of the bottom segment away from the body and including a detent to secure the electronic device, a second side portion extending perpendicularly from a second end of the bottom segment away from the body and including a detent to secure the electronic device, and a back portion for supporting the electronic device, the back portion including an access port;

a first elliptical anchor connected to the base via a first flexible neck, the anchor including an inner metal core for giving weight to the anchor and a bottom surface formed of soft material for contacting the surface of the vehicle and resisting movement relative to the surface;

a second elliptical anchor connected to the base via a second flexible neck, the second anchor including an inner metal portion for giving weight to the anchor and a bottom surface formed of soft material for contacting the surface of the vehicle and resisting movement relative to the surface; and a third elliptical anchor connected to the base via a third flexible neck, the third anchor including an inner metal portion for giving weight to the anchor and a bottom surface formed of soft material for contacting the surface of the vehicle and resisting movement relative to the surface.

21. The friction mount apparatus as set forth in claim 20, wherein the receiving member further includes—
a lower face coupled to the body,
an upper face having a slot formed therein, the slot having an upper retaining edge being defined by a shoulder adapted to engage the electronic device and prevent the device from upward movement relative to the receiving member, and
a releasable locking mechanism operable to releasably retain at least a portion of the electronic device within the receiving slot.

22. The friction mount apparatus as set forth in claim 20, wherein at least a portion of the inner metal portion of at least one of the anchors exhibits magnetic properties for coupling with the surface of the vehicle.

23. A receiving apparatus for pivotally coupling an electronic device to a removable mount, the receiving apparatus comprising:
a circular base for pivotal attachment to the mount; and
a receptacle for receiving and securing the electronic device, the receptacle including—
a bottom segment for seating the electronic device, wherein a first longitudinal edge of the bottom segment is pivotally attached to the base so that the bottom segment pivots relative to the base about a horizontal axis corresponding to the edge, and wherein an arcuate ratchet surface depends from a second longitudinal edge of the bottom segment and adjustably engages the base,
a first side portion extending perpendicularly from a first end of the bottom segment and away from the base, the first side portion including a detent to releasably retain the electronic device,
a second side portion extending perpendicularly from a second end of the bottom segment and away from the base, the second side portion including a detent to releasably retain the electronic device, and
a back portion for supporting the electronic device, the back portion extending perpendicularly from the second longitudinal edge of the bottom portion and away from the base, the back portion including an access port for receiving an electrical contact.

24. A friction mount apparatus for an electronic device, the apparatus comprising:
an elliptical body with a top surface and a bottom surface, wherein a foam layer is attached to the bottom surface so that the foam layer contacts the surface of the vehicle and resists moving relative to the surface of the vehicle;
a receiving member attached to the body for securing the electronic device to the body including—
a base attached to the body, wherein the base pivots relative to the body about a vertical axis, and
a receptacle for receiving and securing the electronic device, the receptacle including
a bottom segment for seating the electronic device, wherein a first edge of the bottom segment is pivotally attached to the base so that the bottom segment pivots relative to the base about a horizontal axis, and wherein a ratchet surface depends from a second edge of the bottom segment and adjustably engages the base,
a first side portion extending perpendicularly from a first end of the bottom segment away from the body and including a detent to secure the electronic device,
a second side portion extending perpendicularly from a second end of the bottom segment away from the body and including a detent to secure the electronic device, and
a back portion for supporting the electronic device, the back portion including an access port,
a first elliptical anchor connected to the base via a first flexible neck, wherein the first neck extends from the body along a minor axis of the body, and wherein the anchor is attached to the next so that a major axis of the anchor is parallel with a major axis of the body, the anchor including an inner metal core for giving weight to the anchor and a foam layer attached to a bottom surface of the anchor for contacting the surface of the vehicle and resisting movement relative to the surface of the vehicle;
a second elliptical anchor connected to the base via a second flexible neck, wherein the second neck extends radially from the body along a line that is one hundred thirty-five degrees counterclockwise from the first neck, and wherein the second anchor is attached to the neck so that a major axis of the anchor is parallel with a major axis of the body, the second anchor including an inner metal core for giving weight to the anchor and a foam layer attached to a bottom surface of the anchor for contacting the surface of the vehicle and resisting movement relative to the surface of the vehicle;
a third elliptical anchor connected to the base via a third flexible neck, wherein the third flexible neck extends radially from the body along a line that is two hundred twenty-five degrees counterclockwise from the first neck, and wherein the third anchor is attached to the third neck so that a major axis of the third anchor is parallel with a major axis of the body, the third anchor including an inner metal core for giving weight to the anchor and a foam layer attached to a bottom surface of the anchor for contacting the surface of the vehicle and resisting movement relative to the surface of the vehicle; and
an electrical connector arm secured to the electronic device through the access port of the back portion, wherein the arm connects the electronic device to a vehicle power source and to a speaker.

25. The friction mount apparatus as set forth in claim 24, wherein the receiving member further includes—
a lower face coupled to the body,
an upper face having a slot formed therein, the slot having an upper retaining edge being defined by a shoulder adapted to engage the electronic device and prevent the device from upward movement relative to the receiving member, and
a releasable locking mechanism for releasably retaining at least a portion of the electronic device within the receiving slot.

* * * * *